US010330164B2

(12) United States Patent
Lindberg et al.

(10) Patent No.: US 10,330,164 B2
(45) Date of Patent: Jun. 25, 2019

(54) COUPLING ASSEMBLY AND DRIVELINE ASSEMBLY

(71) Applicants: GKN Driveline International GmbH, Lohmar (DE); GKN Driveline Köping AB, Köping (DE)

(72) Inventors: Per-Owe Lindberg, Köping (SE); Hans-Peter Nett, Adenau (DE); Mathias Adelt, Bochum (DE); Thomas Weckerling, Sankt Augustin (DE); Björn Hellström, Göteborg (SE); Marten Olsson, Köping (SE)

(73) Assignee: GKN Automotive Ltd., Redditch, Worcestershire (GB)

( * ) Notice: Subject to any disclaimer, the term of this patent is extended or adjusted under 35 U.S.C. 154(b) by 343 days.

(21) Appl. No.: 15/113,899

(22) PCT Filed: Feb. 14, 2014

(86) PCT No.: PCT/EP2014/052965
§ 371 (c)(1),
(2) Date: Jul. 25, 2016

(87) PCT Pub. No.: WO2015/120909
PCT Pub. Date: Aug. 20, 2015

(65) Prior Publication Data
US 2016/0333954 A1    Nov. 17, 2016

(51) Int. Cl.
*F16D 67/02*        (2006.01)
*B60K 17/02*        (2006.01)
(Continued)

(52) U.S. Cl.
CPC .............. *F16D 67/02* (2013.01); *B60K 17/02* (2013.01); *B60K 17/34* (2013.01); *F16D 11/00* (2013.01);
(Continued)

(58) Field of Classification Search
CPC ..... F16D 67/02; F16D 2125/36; B60K 17/02; B60K 17/04; B60K 23/0808
See application file for complete search history.

(56) References Cited

U.S. PATENT DOCUMENTS 6,860,831 B2 * 3/2005 Ziemer ................... F16H 3/666
                                                  475/275
9,267,553 B2 * 2/2016 Mordukhovich ....... F16D 21/08
(Continued)

FOREIGN PATENT DOCUMENTS

CN    102143854 A    8/2011
CN    102369373 A    3/2012
(Continued)

OTHER PUBLICATIONS

International Search Report and Written Opinion for PCT/EP2014/052965 dated Oct. 13, 2014 (8 pages).

Primary Examiner — Ha Dinh Ho
(74) Attorney, Agent, or Firm — Bejin Bieneman PLC

(57) ABSTRACT

A coupling assembly for a driveline of a motor vehicle comprises a first shaft; a second shaft; a coupling which can selectively drivingly connect or disconnect the first shaft and the second shaft; a brake for braking the second shaft relative to a stationary component; and an actuating device for actuating the coupling and the brake. The actuating device comprises a ramp mechanism having a first ring which is axially supported relative to the stationary component, and a second ring which is axially movable relative to the first ring when one of the first and second rings is rotated relative to another one of the first and second rings.

17 Claims, 6 Drawing Sheets

(51) Int. Cl.
*F16D 65/18* (2006.01)
*B60K 17/34* (2006.01)
*F16D 11/00* (2006.01)
*B60K 17/35* (2006.01)
*B60K 23/08* (2006.01)
*F16D 121/24* (2012.01)
*F16D 125/36* (2012.01)

(52) U.S. Cl.
CPC ............ *F16D 65/186* (2013.01); *B60K 17/35* (2013.01); *B60K 23/0808* (2013.01); *F16D 2121/24* (2013.01); *F16D 2125/36* (2013.01)

(56) References Cited

U.S. PATENT DOCUMENTS

| | | |
|---|---|---|
| 2009/0159392 A1 | 6/2009 | Vaughn et al. |
| 2010/0089685 A1 | 4/2010 | Quehenberger et al. |
| 2011/0155530 A1* | 6/2011 | Vierk ...................... F16D 11/14 192/48.6 |
| 2012/0152685 A1* | 6/2012 | Phillips ................. F16D 25/061 192/48.5 |
| 2012/0234641 A1* | 9/2012 | Petzold ................. F16D 25/061 192/48.5 |
| 2014/0020490 A1 | 1/2014 | Greiss et al. |

FOREIGN PATENT DOCUMENTS

| | | |
|---|---|---|
| DE | 102008037886 A1 | 2/2010 |
| DE | 102008063904 A1 | 7/2010 |
| JP | 2001-263397 A | 9/2001 |
| JP | 2006-207666 A | 8/2006 |
| JP | 2010-1070039 A | 5/2010 |
| JP | 2012-512996 A | 6/2012 |
| WO | 2010017882 A1 | 2/2010 |
| WO | 2010078937 A1 | 7/2010 |
| WO | 2012145580 A1 | 10/2012 |

* cited by examiner

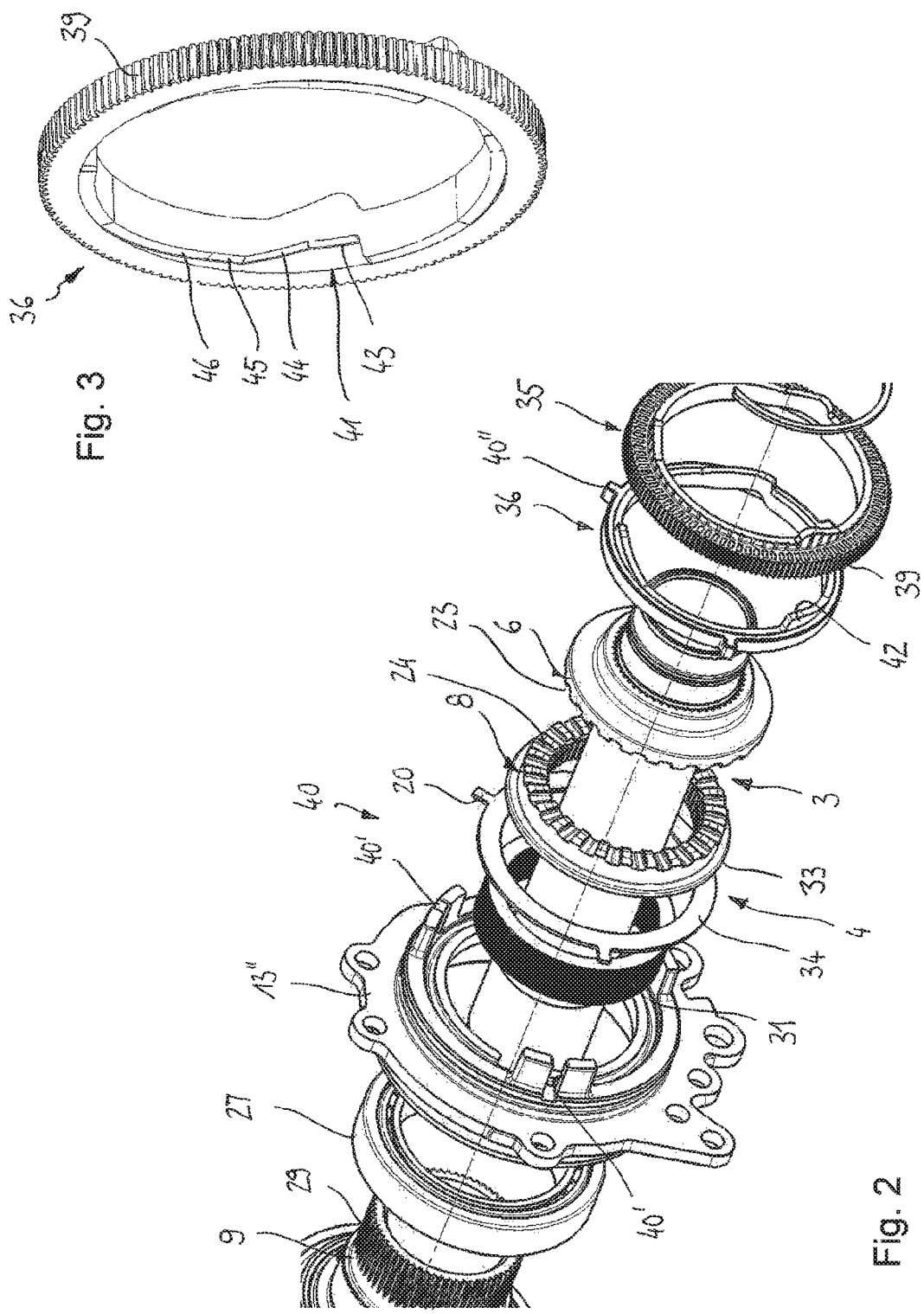

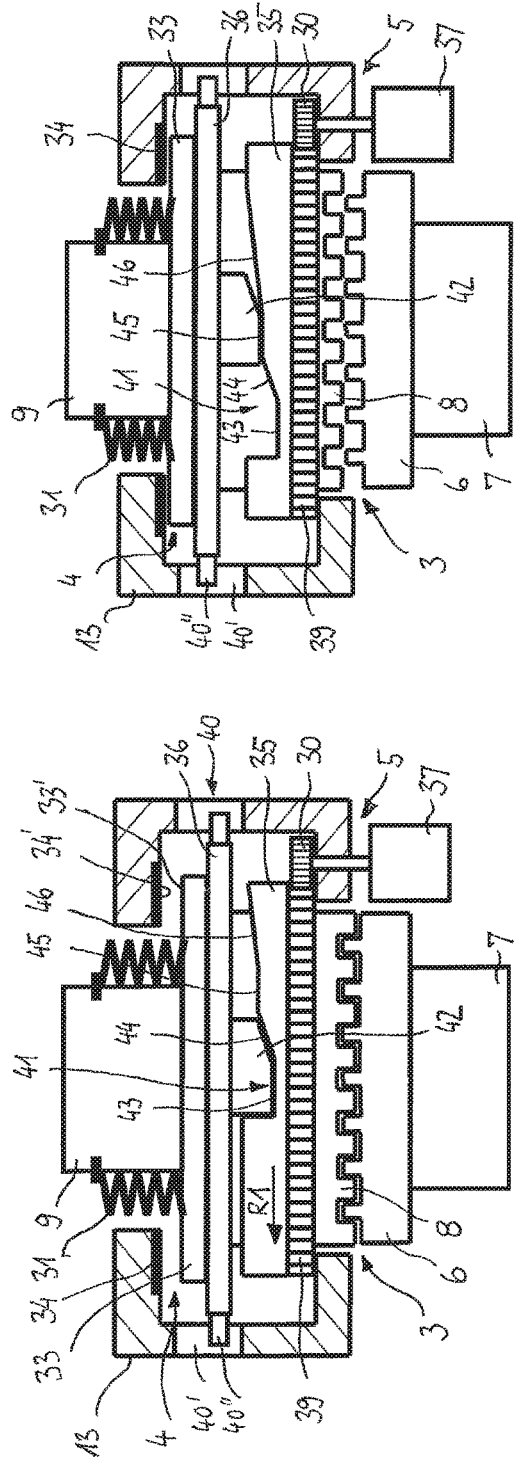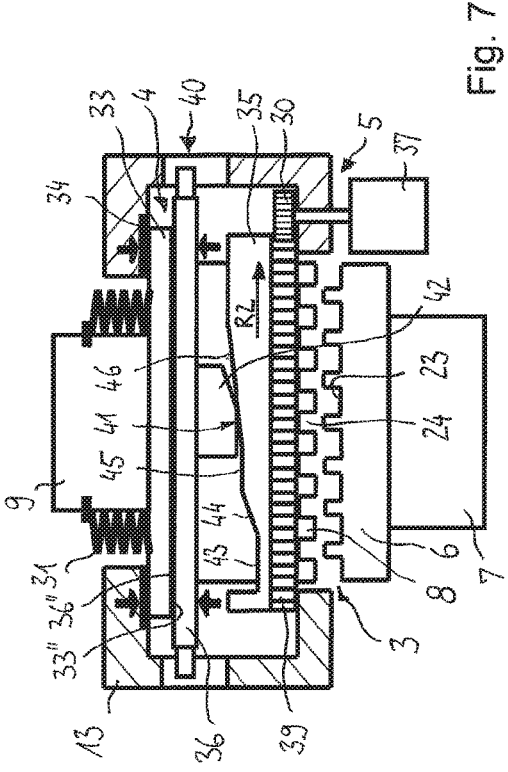

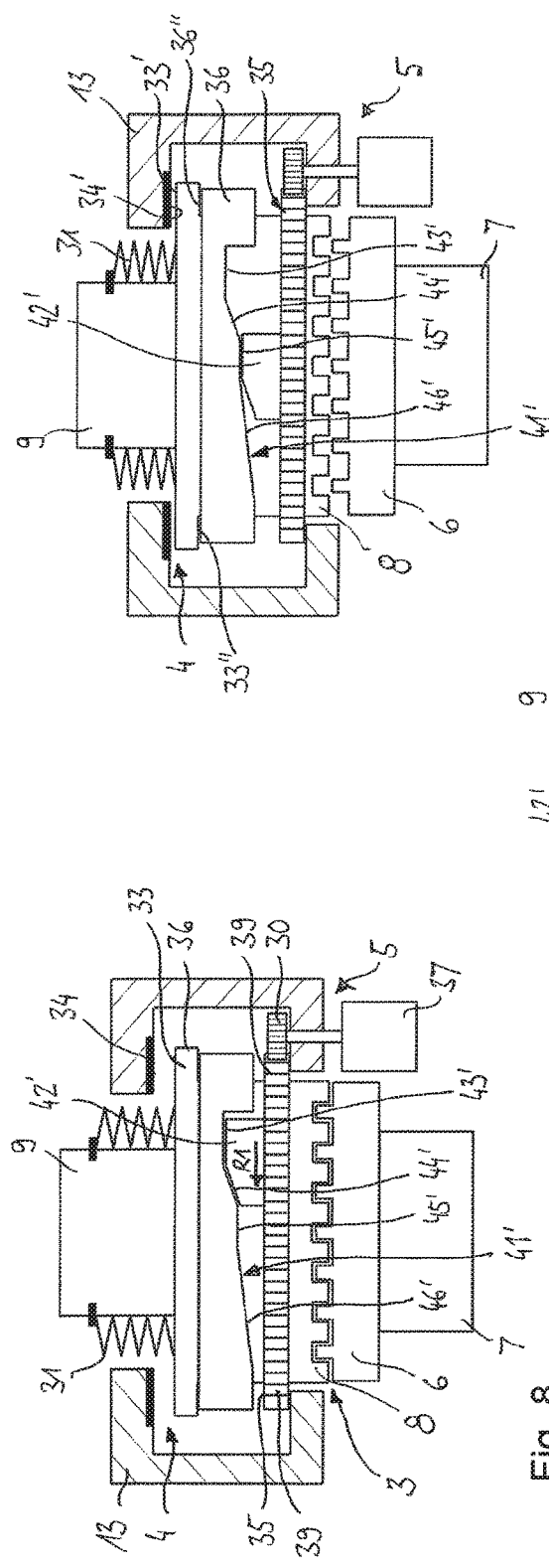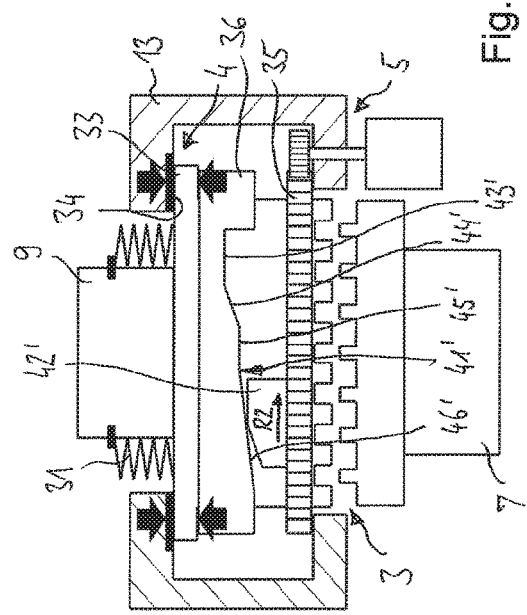

COUPLING ASSEMBLY AND DRIVELINE ASSEMBLY

CROSS-REFERENCE TO RELATED APPLICATIONS

This application is a national stage of, and claims priority to, Patent Cooperation Treaty Application No. PCT/EP2014/052965, filed on Feb. 14, 2014 which application is hereby incorporated herein by reference in its entirety.

FIELD

The present disclosure relates to a coupling assembly for a motor vehicle driven by a plurality of axles, more particularly for a driveline assembly which comprises a first driveline for permanently driving a first driving axle as well as a second driveline for optionally driving a second driving axle. Such drive concepts with an optionally drivable driving axle are also referred to as "hang-on" or "on demand" systems.

BACKGROUND

There exist different drive concepts for motor vehicles. There are thus motor vehicles with a front engine in which the front axle is permanently driven and the rear axle can be optionally driven. There are also motor vehicles in which the rear axle is permanently driven and the front axle can be optionally connected. Further, there are motor vehicles with a rear engine in which the rear axle is permanently driven and the front axle can be optionally connected by a hang-on coupling.

Document WO 2012/145580 A1 discloses a power transfer unit for selectively transferring torque from a first shaft to a second shaft by means of an activating assembly. The activating assembly includes a sliding cam, a rotating cam, an actuator for rotating the rotating cam relative to the sliding cam, and an engaging gear. The gear is configured to be moved by the sliding cam between a first engaged position where torque is transferred to a disengaged position where no torque is transferred.

From US 2010/0089685 A1 a clutch is known having two clutch parts which can be brought into engagement in form fitted manner for torque transfer. A shift member is movable in a first direction to bring the clutch parts out of engagement, an in a second direction to bring the clutch parts into engagement. A motor is provided for the movement of the shift member in the first direction and a spring element is provided for movement of the shift member in the second direction.

From DE 10 2008 037 886 A1, corresponding to WO 2010/017882 A1, a drive assembly is known for a motor vehicle driven by a plurality of axles. The drive assembly comprises a permanently driven first driveline and an optionally drivable second driveline. The optionally drivable driveline comprises a first coupling, which is arranged in the power path in front of the propeller shaft, and a second coupling which is arranged in the power path behind the propeller shaft. By opening the first and the second coupling, the propeller shaft can be switched so as to be torque-free.

DE 10 2008 063 904 A1, corresponding to WO2010/078937 A1, proposes a drive assembly for a vehicle driven by a plurality of axles. The drive assembly comprises a differential unit, a controllable hang-on coupling and a locking coupling for locking the differential movement of the differential. The two couplings are arranged coaxially relative to one another and can be actuated by a ball ramp assembly. According to one embodiment, it is proposed that first the locking coupling is actuated and then the hang-on coupling. According to a further embodiment it is proposed that first the hang-on coupling is actuated and then the locking coupling.

SUMMARY

Disclosed herein is a coupling assembly which allows an optionally drivable driveshaft to be securely disconnected and to reduce undesirable drag moments. Further disclosed is a drive assembly with such a coupling assembly in which undesirable drag moments and friction losses are reduced.

A coupling assembly for a driveline of a motor vehicle comprises a first shaft; a second shaft; a coupling which can selectively connect or disconnect the first shaft and the second shaft; a brake for braking the second shaft relative to a stationary component; and an actuating device for actuating the coupling and the brake, wherein the actuating device comprises a ramp mechanism having a first ring which is axially supported relative to the stationary component, and a second ring which is axially movable relative to the first ring when the first and the second ring are rotated relative to one another.

An advantage of the coupling assembly is that the shaft positioned in the power path behind (downstream) the coupling can be actively braked in the torque-free condition. Thus, drag moments and friction losses caused by rotating the driveshaft in the load-free condition can be reduced. If a friction plate coupling is provided in the driveline, said friction plate coupling can be quickly de-oiled by braking the driveshaft, which also reduces drag moments and friction losses. The actuating device is designed in such a way that initially the coupling is at least partially opened, with the brake subsequently being closed. The actuating device can be configured such that the brake is not actuated until the coupling has at least partially been opened. "At least partially" in this context means that, depending on its design, the coupling can be opened either partially or completely prior to the brake being actuated in the closing direction in order to brake the driveshaft. The brake can be configured such that the driveshaft can be braked completely relative to the stationary component, i.e. that it stands still. The operation of braking the second shaft is effected at least indirectly relative to the fixed component, i.e., directly by friction contact with the fixed component or indirectly by arranging therebetween one or several further components. The fixed component can be a housing part of the coupling assembly or a component fixedly connected to the housing.

The coupling can have any design and comprise any coupling means suitable for selectively effecting or interrupting a transmission of torque in the driveline of a motor vehicle. For example, a form-locking coupling can be used such as a toothed clutch, claw clutch or dog clutch. The form-fitting coupling comprises at least two coupling parts which can be made to engage one another in a form-fitting manner. In the closed condition the coupling parts engage one another form-fittingly so as to transmit torque. In the open condition, the coupling parts are disengaged so as to freely rotate relative to one another. If a form-locking coupling is used, it should be opened completely before the brake is actuated for braking the driveshaft. Alternatively, it is also possible to use a friction coupling, more particularly a multi plate coupling. A multi plate coupling normally comprises a first coupling part to which first friction plate are connected in a rotationally fixed and axially movable way, as well as a second coupling part to which second friction plates are connected in a rotationally fixed and axially movable way. By axially loading the plate package consisting of the first and second friction plates, the rotational movements between the two coupling parts are adjusted to one another. If a friction coupling is used, the opening of the coupling and the closing of the brake can also be effected in a flowing way, i.e. the brake can already be loaded when the friction coupling has only partially been opened.

In one example, the coupling comprises a first coupling part and a second coupling part. The first coupling part can be connected to the first shaft in a rotationally fixed way, and axially supported on a stationary component. The second coupling part is connected to the second shaft in a rotationally fixed way and is axially movable relative to the first coupling part. The coupling can optionally be transferred into a closed position in which the two shafts are drivingly connected to one another for transmitting torque, and into an open position in which the two shafts are uncoupled from one another. The design of the second shaft depends on the location of installation and can be adapted to the technical requirements and installation conditions. In any case, it is a torque transmitting component which can be provided in the form of an input or output shaft.

The actuating device for actuating the coupling and the brake respectively can be driven by any suitable driving means such as an electric, hydraulic or pneumatic motor. The actuator can be controlled by an electronic control unit. In an example, one single actuating device actuates the coupling and also the brake. According to one example, the actuating device comprises an electric drive and a transmission, wherein the transmission has a transmission ratio between an input and an output gear which is larger than $1/25$ and smaller than $1/15$ ($1/25 < i < 1/15$). The electric motor can have a torque output of 0.5 to 1.5 Nm, preferably about 1.0 Nm. Thus, with an electric motor of 1 Nm output torque, an actuating force for loading the brake can be achieved which amounts to more than 400 N.

The actuating device comprises a ramp mechanism with a first ring which is axially supported relative to a stationary component and thus can also be referred to as a supporting ring; and with a second ring which is axially movable by rotating the two rings relative to one another and which thus can also be referred to as a setting ring. "Rotating relative to one another" in this context means that either only one of the two rings is rotated, whereas the other one is rotationally fixed relative to a fixed component, or that both rings are rotated relative to one another. To the extent that a direction of rotation is mentioned, this refers to a relative rotation of the two rings relative to one another, i.e., independently of whether only one or two rings are rotated.

In an example with respect to the design of the rings the first ring is rotatingly drivable relative to the stationary component and/or the second ring is rotationally fixed relative to the stationary component. This example includes the following possibilities: the first ring is axially supported and rotatingly drivable, and the second ring is axially displaceable and rotationally fixed; the first ring is axially supported and rotationally fixed and the second ring is axially displaceable and rotatingly drivable, or the first ring is axially supported and the second ring is axially displaceable and both rings are rotatingly drivable. In principle, the drive can have any design, for example it can be an electric motor, a hydraulic or a pneumatic drive. The drive drives the driven ring around an axis of rotation which is coaxially arranged to the axis of the coupling.

In one example, the ramp mechanism is designed such that, starting from an end position in which the first ring and the second ring axially approach one another, in a first rotation range the coupling is opened by relatively rotating the two rings relative to one another and, by continuing the rotation in the same relative direction of rotation, in a second rotation range, the brake is closed. For this purpose it is more particularly proposed that at least one of the two rings comprises a setting contour with variable heights in the circumferential direction against which the other ring is axially supported.

In one example, the setting contour—starting from the end position in which the two rings axially approach one another—can comprise a first ramp portion with a first gradient and a second ramp portion with a second gradient, wherein the first gradient can be greater than the second gradient. This arrangement ensures that the coupling is opened relatively quickly. An intermediate portion with a smaller gradient can be provided between the two ramp portions, with the gradient of the intermediate portion possibly amounting to zero. The first ramp portion can extend over an angle range between 15° and 25° in a circumferential direction. The second ramp portion can have an angle range of 30° to 50° around the axis of rotation. The intermediate portion is shorter than the ramp portions and thus extends over less than 15°. The first rotation range can have a first rotation plunge ratio which is larger than 2° rotation per millimeter plunge and/or smaller than 8° rotation per millimeter plunge. The lower limit of 2° per millimeter creates a ramp which is steep enough to allow a connection in less than 0.5 seconds. The higher limit of 8° creates a ramp which is flat enough to allow a safe disconnect of the coupling against the friction created by drag torque. In the second rotation range, the corresponding second rotation plunge ratio can be larger than 15° rotation per millimeter plunge and/or smaller than 23° rotation per millimeter plunge. The lower limit of 15° per millimeter provides a ramp which is steep enough to prevent self-blocking when the brake is opened. The higher limit of 23° provides a ramp which is flat enough to ensure an axial brake force of more than 500 N, with an electric motor of 1 Nm torque and a gear ratio of i=18. It is to be understood that depending on the technical requirements other angle ranges, respectively rotation plunge ratios of the ramp mechanism are also conceivable.

The two rings can each comprise a plurality of identical setting contours which are uniformly circumferentially distributed. To ensure uniform axial support, the supporting ring and the setting ring each comprise three or more setting contours and counter contours respectively around their circumferences. The setting contours and the counter contours can be directly axially supported on one another. However, it is also possible that the actuating device is provided in the form of a ball ramp assembly. In this case, the two rings each comprise circumferentially distributed ball grooves with variably depths in a circumferential direction. Two opposed ball grooves each contain a ball via which the rings indirectly support one another.

For opening and closing the coupling and the brake respectively, basically two embodiments of the actuating device are possible.

According to a first possibility, the opening of the coupling and the closing of the brake are respectively effected by rotating the two rings relative to one another in a first relative direction of rotation, whereas the closing of the coupling and the opening of the brake are respectively effected by rotating the two rings relative to one another in an opposed second direction of rotation.

According to a second possibility, the opening of the coupling and the closing of the brake as well as the closing of the coupling and the opening of the brake are respectively effected by relatively rotating the two rings in one and the same direction of rotation.

In both solutions, it is possible that the brake comprises a first brake part which is connected to the second coupling part, and a second brake part which is axially supported by a fixed component. By means of the actuating device, the first brake part can be moved into friction contact with the second brake part in order to be braked relative to the latter. The friction contact is effected by first braking surfaces formed between the first and second brake parts. Another friction contact can be effected by second braking surfaces formed between the first breaking part and the axially moveable setting ring. This design is advantageous in that the brake comprises two sets of braking faces so that high braking moments can be achieved to quickly decelerate the first braking part relative to the housing. The braking faces can also be referred to as friction faces.

To achieve a particularly compact and simple design, it is advantageous if the first brake part and the second coupling part are integrally connected with one another. However, it is understood that said components can also be produced separately and then connected to one another. For actuating the brake, the first brake part is loaded jointly with the second coupling apart towards the second brake part. As a result of the friction contact between the two brake parts, the second coupling part and the driveshaft connected thereto are braked.

The brake can be released again by rotating the first ring relative to the second ring in an opposed direction of rotation, i.e., back from the second rotation range to the first rotation range. Alternatively, the process of again opening the brake can be effected by continuing to relatively rotating the first ring relative to the second ring in the same direction of rotation beyond the second region of rotation. The highest position of the ramp portion is followed by a transition portion which preferably comprises the gradient zero and which, via a step, is connected to the circumferentially adjoining setting contour. In both cases, the setting contour preferably comprises a first ramp portion with a first gradient for opening the coupling and a second ramp portion with a greater second gradient for closing the brake. Between the first and the second ramp portion there can be provided an intermediate portion whose gradient is preferably zero.

In an example that applies to a ring rotatingly drivable in the same direction of rotation for opening and closing purposes, there is provided a supporting spring via which the second brake part is resiliently supported on the stationary component. Said supporting spring allows the movable brake component to be axially moved beyond a position in which the brake is already closed.

According to a possible design which applies to all embodiments, there is provided a returning spring to which at least one of the following apply: the returning spring loads the brake or at least a part thereof in the opening sense and/or the returning spring loads the coupling or at least a part thereof in the closing sense. However, a reverse design is also possible in which case the returning spring is effective in the closing sense of the brake and/or in the opening sense of the coupling. In this case the actuating device would operate in the respective reverse direction, i.e., against the spring force.

Furthermore, a driveline assembly for a motor vehicle comprises: a permanently drivable first driveline with a first driving axle; an optionally drivable second driveline with a second driving axle; wherein the second driveline comprises a first coupling assembly, a second coupling assembly and a driveshaft which is arranged in the power path between the first and the second coupling assembly, wherein at least one of the first and the second coupling assemblies is designed in accordance with one or several of the above-mentioned embodiments. In the closed position of the first and of the second coupling, the driveshaft transmits torque to the second driving axle.

An advantage of the driveline is that, in the open condition of the two couplings, the driveshaft positioned between the first and the second coupling assembly can be disconnected completely, which leads to a reduction of the undesirable friction losses. Because, in accordance with the present disclosure, one of the two coupling assemblies comprises a brake, the driveshaft can be braked immediately after the coupling has been opened. This is particularly advantageous if one of the two couplings is provided in the form of a friction plate coupling because after having been opened, the latter can be de-oiled quickly, which leads to a reduction in drag moments.

In one example, the driveline assembly comprises a transfer case which distributes a torque introduced by a drive unit to the first driveline and to the second driveline, wherein the first driveline is drivingly connected to the transfer case to permanently transmit torque to the first driving axle, and wherein the second driveline can be drivingly connected to the transfer case to optionally transmit torque to the second driving axle. The driveshaft is preferably provided in the form of a propeller shaft which is arranged in the power path between the transfer case and the second driving axle. The first coupling assembly is arranged in the power path between the transfer case and the propeller shaft and is provided in accordance with one or several of the abovementioned designs. The second coupling assembly is arranged in the power path between the propeller shaft and the rear axle differential and preferably configured in the form of a friction plate coupling.

SUMMARY OF THE DRAWINGS

With reference to the drawings:

FIG. 2 shows a coupling assembly according to FIG. 1 in an exploded form in a three-dimensional view.

FIG. 3 shows the first ring of the coupling assembly according to FIG. 1 as a detail in a perspective view.

FIG. 5 is a diagrammatic illustration of the coupling assembly according to FIG. 1 in a first switching condition.

FIG. 6 is a diagrammatic illustration of the coupling assembly according to FIG. 1 in a second switching condition.

FIG. 7 is a diagrammatic illustration of the coupling assembly according to FIG. 1 in a third switching condition.

FIG. 8 is a diagrammatic illustration of a second example coupling assembly in a first switching condition.

FIG. 9 is a diagrammatic illustration of the coupling assembly according to FIG. 8 in a second switching condition.

FIG. 10 is a diagrammatic illustration of the coupling assembly according to FIG. 8 in a third switching condition.

DESCRIPTION

Figure 1:
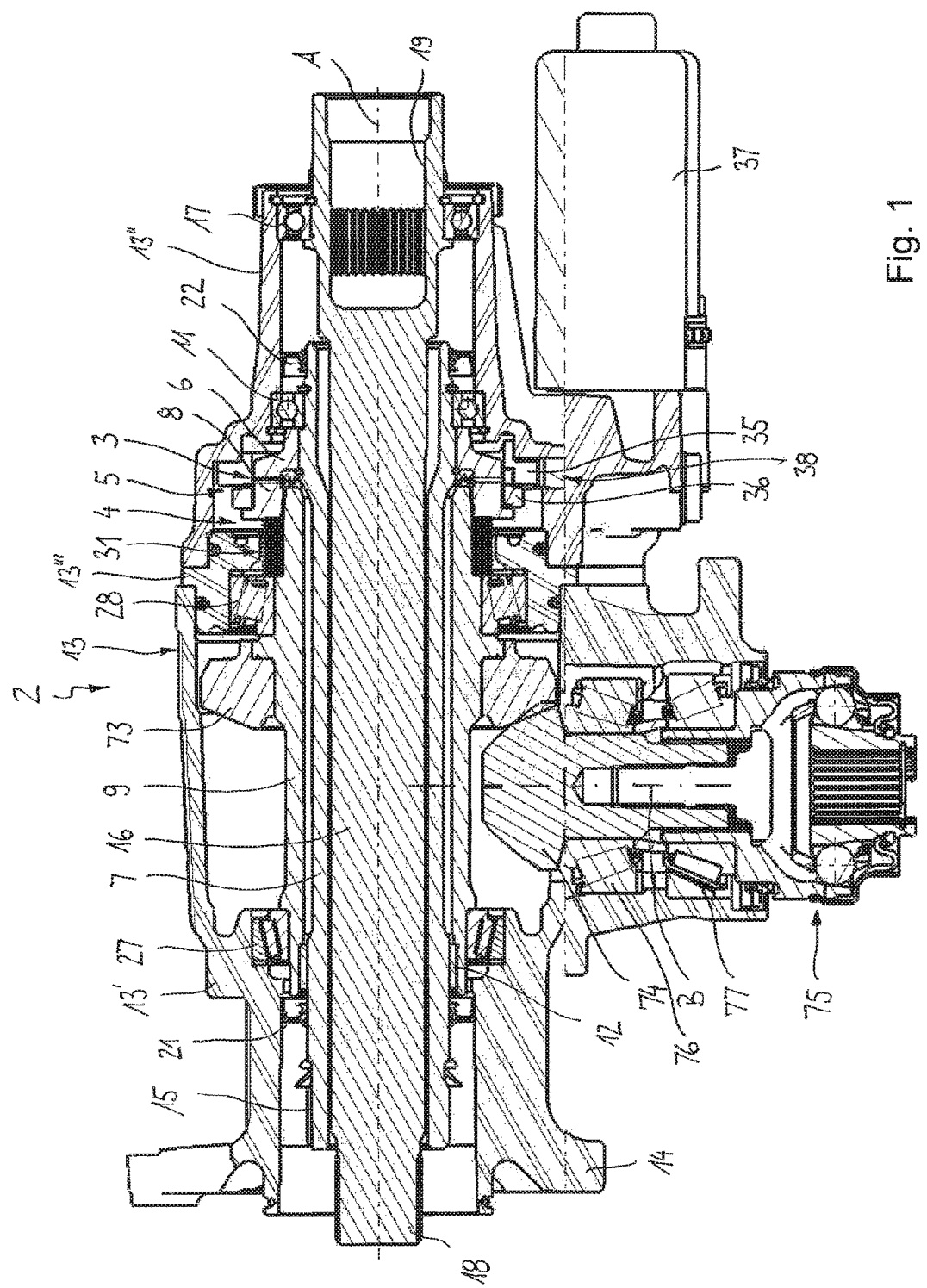
FIG. 1 is a longitudinal section through a first example coupling assembly.
Figure 4:
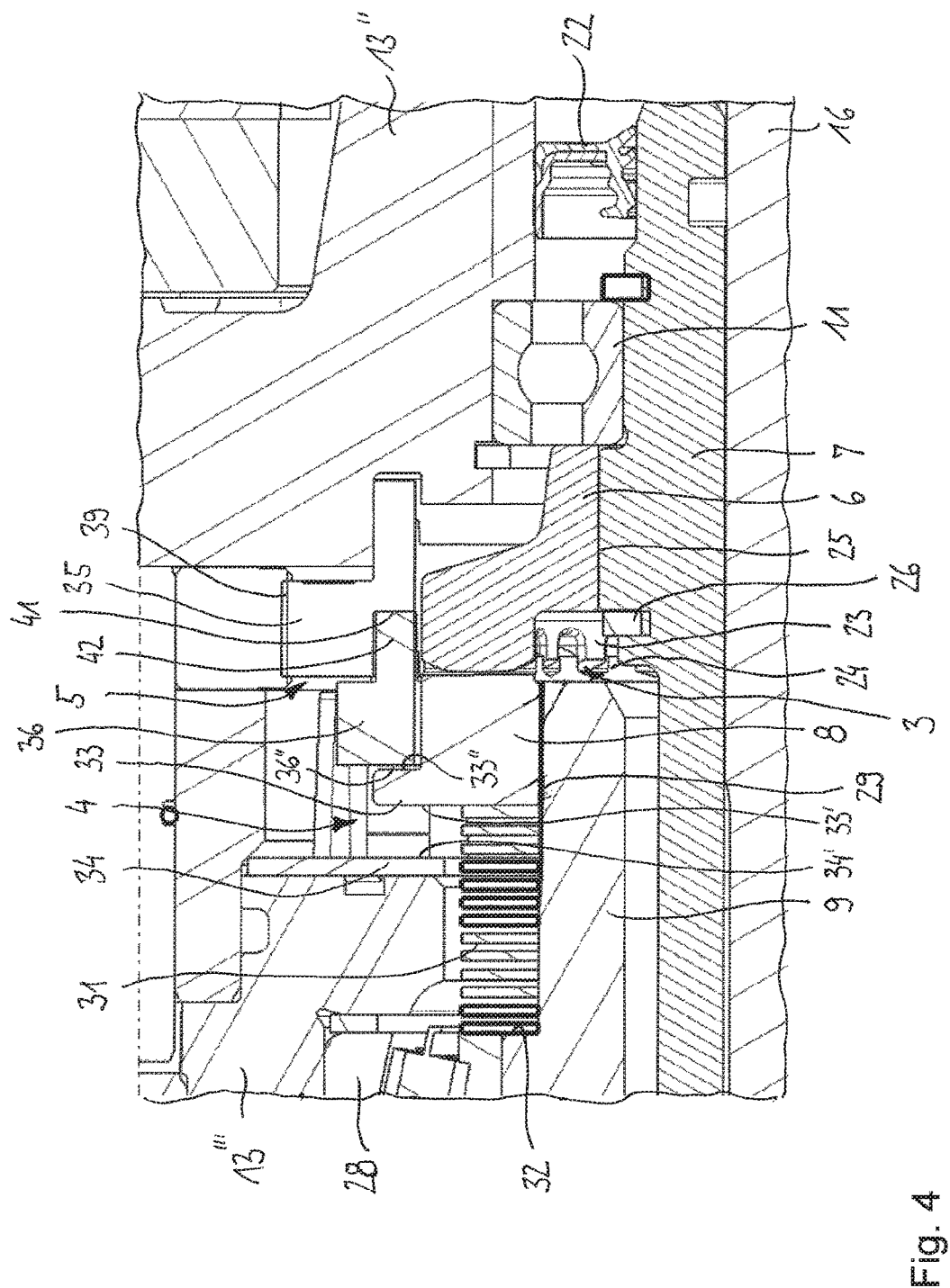
FIG. 4 is a detail A of the coupling assembly according to FIG. 1.

Below, FIGS. 1 to 7 will be described jointly. They show a first example coupling assembly 2. The coupling assembly 2 serves in the driveline of a motor vehicle for optionally driving a driving axle of the motor vehicle. More particularly, the coupling assembly 2 can be used in a motor vehicle which is driven by a plurality of axles and which comprises a permanently driven primary driving axle and an optionally drivable secondary driving axle.

The coupling assembly 2 comprises a coupling 3 for optionally effecting or interrupting torque transmission; a brake 4 for braking part of the driveline relative to a stationary component when the coupling 3 is open, as well as an actuating device 5 for actuating the coupling 3 and the brake 4. More particularly, the actuating device 5 is designed such that the coupling 3 and the brake 4 can be actuated in interdependence of one another, which will be explained in greater detail below.

The coupling 3 comprises a first coupling part 6 which is connected to a first shaft 7 in a rotationally fixed way, as well as a second coupling part 8 which is connected to a second shaft 9 in a rotationally fixed way. The actuating device 5 can selectively make the first coupling part 6 and the second coupling part 8 to engage one another for transmitting torque, or disengaged from one another so that a transmission of torque is interrupted. The first shaft 7 is provided in the form of a hollow shaft and is rotatably supported relative to a stationary housing 13 around an axis of rotation A by means of two bearings 11, 12. The housing 13 comprises a first housing part 13', a second housing part 13" and an intermediate third housing part 13'" arranged therebetween. The housing parts are connected to each other by any suitable connecting means such as bolts. The housing 13 further comprises a connecting portion 14 for fixing the housing to a further component of the driveline, such as a gearbox.

For introducing torque, the first shaft 7 comprises splines 15 which can engage corresponding counter splines in a rotationally fixed way. A through-driveshaft 16 is coaxially arranged inside the first shaft 7. The through-driveshaft 16 is rotatable relative to the first shaft 7 around the axis of rotation A and is rotatably supported relative to the stationary housing 13 by a further bearing 17. At a first end 18, the through-driveshaft 16 comprises shaft teeth (outer splines) for being drivingly connected to an attaching component, and at an opposed second end 19, it comprises hub teeth (inner splines) for drivingly connecting a further drive component. For sealing the annular chamber formed between the first shaft 7 and the housing 13 there is provided a first seal 21 at the first end of the shaft 7 and a second seal 22 at the second end of the shaft 7.

It can be seen that the coupling 3 is provided in the form of a form-fitting coupling wherein the first coupling part 6 comprises first engaging means 23 which can be made to form-fittingly engage corresponding engaging means 24 of the second coupling part 8. The first and the second engaging means 23, 24 are provided in the form of crown teeth 23, 24 or claw elements. To that extent, the coupling 3 can also be referred to as a tooth or claw coupling, or dog clutch. However, it is understood that other coupling types can also be used which optionally effect or interrupt a transmission of torque.

The first coupling part 6 is axially supported via the bearing 11 to the housing 13 and is connected in a rotationally fixed way via a shaft connection 25 to the first shaft 7. A securing ring 26 secures the first coupling part 6 in the opposed axial direction on the shaft 7.

The second coupling part 8 is connected to the shaft 9 in a rotationally fixed and axially displaceable way. The second shaft 9 is supported by the bearings 27, 28 so as to be rotatable around the axis of rotation A in the housing 13. Axial support for the second shaft 9 is provided by the second baring 27 in the housing 13. The rotationally fixed connection between the second coupling part 8 and the second shaft 9 is effected via a spline connection 29, with the second coupling part 8 being axially displaceable relative to the second shaft 9. The second coupling part 8 is indirectly axially supported on the fixed housing 13 via spring means 31. The support is indirect in that the spring means 31 are supported on a supporting face 32 of the second shaft 9 which, in turn, is axially supported via the bearing 27 in the housing 13. The spring means 31 are built in with an axial pretension and load the second coupling part 8 in the closing sense of the coupling 3. The spring means 31 act against the actuation force of the actuating part 5, so that they can also be referred to as returning springs 31. In the present example the spring means 31 are provided in the form of a spiral spring made out of a strip material, but other types of springs such as a spring package consisting of plate springs can also be used. The restoring force of the spring 31 is preferably larger than 100 N and/or smaller than 300 N in an installed condition.

The brake 4 comprises a first brake part 33 which is fixedly connected to the second coupling part 8, as well as a second brake part 34 which is connected or can be connected in a rotationally fixed way relative to the fixed housing 13. For this purpose, the second brake part 34 comprises radial projections 20 which engage respective longitudinal grooves 40' of the housing part 13'" so as to form anti-rotation means. By axially loading the second coupling part 8 away from the first coupling part 6, the brake part 33 connected to the second coupling part 8 and jointly rotating therewith is loaded against the fixed brake part 34. As a result of the friction locking effect between the brake parts 33, 34, the first brake part 33 is delayed until it stops. As a result, all the parts drivingly connected to the brake part 33 come to a standstill.

The first brake part 33 and the second brake part 34 comprise a first pair of friction faces 33', 34' which decelerate the rotational movement of the first brake part 33, when the brake 4 is axially loaded. A second pair of friction faces 33", 36" is formed between the first braking part 33 and the second ring 36. Thus, the brake 4 comprises two pairs of friction faces 33', 34'; 33", 36" so that high braking moments can be achieved to quickly decelerate the braking part 33 and the components drivingly connected thereto, relative to the housing 13.

The first brake part 33, more particularly, is produced so as to be integral with the second coupling part 8, which has an advantageous effect on production and assembly procedures. The second brake part 34 is provided in the form of a brake disc or friction disc which is held in a rotationally fixed condition relative to the housing 13 and is axially supported. In a closed condition of the brake 4, the coupling 3 is open, so that the driveline part drivingly connected to the second coupling part 8 is disconnected from the first coupling part 6. In the closed condition of the coupling 3, the brake 4 is released so that the second coupling part 8 and all the components drivingly connected thereto are able to rotate freely. It can be seen that the spring means 31 load the brake 4 in the opening sense and the coupling 3 in the closing sense. More particularly, the friction faces 33', 34' of the first braking set are disconnected from each other by the spring 31, whereas the friction faces 33", 36" of the second braking set are made to contact each other. The coupling 3 and the brake 4 respectively are actuated by the actuating device 5 which will be explained in greater detail below with reference to FIGS. 4 to 6.

The actuating device 5, which can also be referred to as an actuator, comprises a first ring 35 which is axially supported relative to the housing 13 and can thus also be referred to as a supporting ring, as well as a second ring 36 which, when the two rings 35, 36 axially rotate relative to one another, is axially displaceable. For rotating the rings 35, 36 relative to one another, there is provided a drive unit in the form of an electric motor 37 and a transmission 38. The transmission 38 comprises a pinion 30 which can be rotatingly driven by the electric motor 37 and engages corresponding outer teeth 39 of the first ring 35. The second ring 36 comprises anti-rotation means 40 by means of which it is received in the housing 13 in a rotationally fixed way. For this purpose, the housing 13 is provided with longitudinal grooves 40' in which respective radial projections 40" of the second ring 36 are held in a rotationally fixed and axially moveable way.

The first ring 35 and the second ring 36 jointly form a ramp mechanism which is designed such that—starting from an end position in which the second ring 36 axially approaches the first ring 35—by relatively rotating the first ring 35, the second ring 36 is moved axially away from the first ring 35. For this purpose, the first and the second ring 35, 36 comprise corresponding setting contours 41, 42 by means of which they are axially supported relative to one another. In the circumferential direction, the setting contours 41, 42 comprise variable heights, so that a relative rotational movement of the two rings 35,36 relative to one another is converted into an axial movement of the second ring 36. The setting contours 41 of the first ring 35 each comprise— starting from a first portion 43 with a greater depth—upon rotation in the first direction of rotation R1, a first ramp portion 44 with a greater gradient, a circumferentially adjoining intermediate portion 45 without gradient and an again adjoining second ramp portion 46 with a smaller gradient. The circumferential angle of the first ramp portion 44 is smaller than the circumferential angle of the second ramp portion 46. Because of this defined contour, a rotation of the first disc 35 in direction R1 results in a relatively rapid axial movement of the second disc 36 towards the brake 4 when the supporting element 42 moves along the first gradient portion 44.

The first ramp portion 44 extends over an angle range between 15° and 25° in circumferential direction around the axis of rotation A. The second ramp portion 46 has an angle range of 30° to 50° around the axis of rotation. The intermediate portion is shorter than the ramp portions and thus extends over less than 15°. The first rotation range for actuating the coupling 3 has a first rotation plunge ratio which is larger than 2° rotation per millimeter plunge and smaller than 8° rotation per millimeter plunge. In the second rotation range for actuating the brake 4, the corresponding second rotation plunge ratio is larger than 15° rotation per millimeter plunge and smaller than 23° rotation per millimeter plunge.

Each setting contour of the first ring 35 is associated with a supporting element 42 of the second ring 36. In an end position of the actuating device 5, the supporting element 42 is located in the first portion 43 of the setting contour 42, so that the two rings 35, 36 axially approach one another. In this switched position, which is shown in FIG. 5, the coupling 3 is in the connect mode. By relatively rotating the first ring 35 in the first direction of rotation R1, the supporting element 42 moves along the gradient portion 44, so that the second ring 36 is axially loaded away from the first ring 35. The second coupling part 6 on which the first ring 35 is axially supported is thereby loaded away from the first coupling part 6 so that the coupling 3 is opened. A fully open condition is reached when the supporting element 42 is arranged in the gradient-free intermediate portion 45. This condition is shown in FIG. 6. It can be seen that the coupling 3 as well as the brake 4 has been opened. This condition can also be referred to as a freewheeling mode or a disconnect mode. By continuing rotation of the first ring 35 in the first direction of rotation R1 beyond the freewheeling condition, the second ring 36, together with the second coupling part 8 and the first brake part 33 connected thereto, is loaded towards the second brake part 34. This is achieved in that the supporting element 42 slides along the flatter gradient portion 46 of the first ring 35 in the circumferential direction. In the process, the two brake parts 33, 34 come into friction contact with one another, so that the rotating brake part 33, together with the drivingly connected components, is braked relative to the stationary component 13. This brake mode is shown in FIG. 7. The arrows in the region of the brake 4 indicate the friction locking condition between the two brake parts 33, 34. In this condition, the second shaft 9 stands still and does not transmit any torque. By designing the ramp assembly in this way it is ensured that the brake 4 is closed only when the coupling 3 is fully open.

If a renewed transmission of torque is required, the first ring 35 is now rotated in the opposed direction of rotation R2. The setting ring 42 will then move along the gradient portion 36 back into the deeper regions, so that, as a result of the spring force of the returning spring 31, the second brake part 33 is again loaded away from the first brake part 34. The braking function of the second shaft 6 is thus eliminated. By continuing to rotate the first ring 35 beyond the free-wheeling condition, the supporting elements 42 of the second ring 36 can move into the respective end portions 43 of the first ring 35. In this way, the second coupling part 8, too, is again axially loaded towards the first coupling part 6 until the teeth engage one another completely. In this condition, a transmission of torque from the first shaft 7 via the coupling 3 to the second shaft 9 can again take place. If there is a tooth-on-tooth condition of the coupling 3, the axially moveable second ring 36 keeps its axial position when the drivable first ring 36 is being rotated into the second direction R2. In other words, by rotating the first ring 35 towards deeper regions of the setting contour 41, the second ring 36 is unblocked in the axial direction and thus can axially move towards the first ring 35, so as to close the coupling 3 again. Once the teeth of one of the coupling parts 6, 8 are arranged opposite the tooth spaces of the other coupling parts 8, 6, the second ring 35 and thus the second coupling part 8 are axially moved to engage the first coupling part 6, by means of the pretensioned spring 31.

The example shown in FIGS. 5 to 7 includes a ramp assembly wherein the setting contour 41 is associated with the rotatingly drivable first ring 35, whereas the supporting elements 42 are associated with the axially movable second ring 36. It is to be understood that a kinematically reversed arrangement is also possible.

The example shown in FIGS. 8 to 10 includes such an embodiment with the arrangement of the setting contour and of the supporting elements respectively being reversed. It can be seen that the supporting elements 42' are associated with the rotatingly drivable first ring 35, whereas the respective setting contours 41' are associated with the axially movable second ring 36. The mode of functioning is the same as in the above-described embodiment so that, to that extent, reference can be made to the above description.

The end position in which the two discs 35, 36 axially approach one another is shown in FIG. 8. In this condition, the coupling 3 is in connect mode. FIG. 9 shows the free-wheeling condition in which both the coupling 3 and the brake 4 are in a disconnected mode. FIG. 10 shows the second end condition which is reached by the first ring 35 continuing to rotate in the first direction of rotation R1. In this end condition the brake 4 is closed so that the second shaft 9 is stationary relative to the fixed housing 13 (brake mode). By again rotating the first ring 35 in the opposed direction of rotation R2, the brake 4 is opened again and the coupling 3 is closed again.

Figure 12:
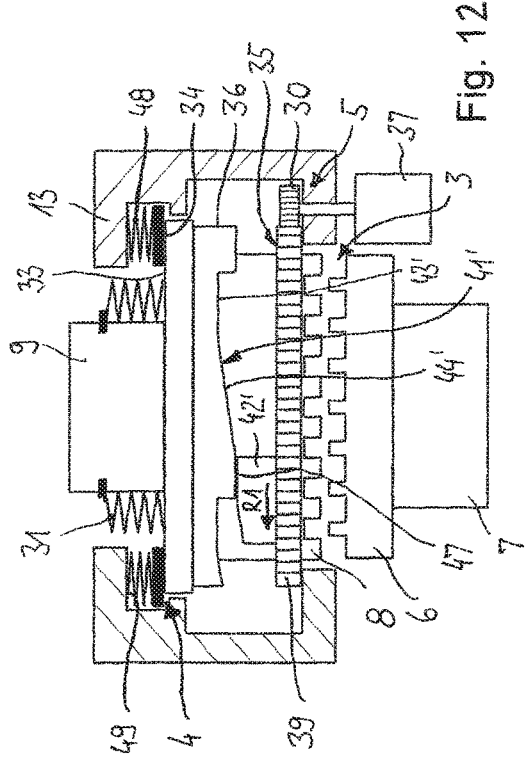
FIG. 12 is a diagrammatic illustration of the coupling assembly according to FIG. 11 in a second switching condition.
Figure 11:
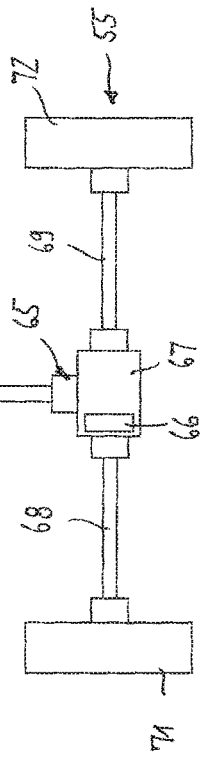
FIG. 11 is a diagrammatic illustration of a third example coupling assembly in a first switching condition.

FIGS. 11 and 12 show a further example of the coupling assembly 2, which largely corresponds to the example of FIGS. 8 to 10, so that as far as the common characteristics are concerned, reference is made to the above description. Identical components or components corresponding to one another have been given the same reference numbers as in FIGS. 8 to 10. Below, reference is made to the differences in particular.

A special feature of the example of FIGS. 11 and 12 is that the operations of opening the coupling and closing the brake take place by rotating the first ring 35 in a same direction of rotation R1 as closing the coupling and, respectively opening the brake. For this purpose the second brake part 34 is axially supported via a spring 48 against the stationary housing 13. Said spring 48 enables the supporting elements 42'—when these have not yet reached the highest portion 47 of the setting contour 41' and when the brake 4 has already been activated—to be moved beyond said brake condition in the first direction of rotation R1. The first brake part 33, which is already in contact with the second brake part 34, is thus loaded jointly with same against the returning force of the spring 48 towards the contact face 49 of the housing 13. After the highest portion 47 has been rotationally overcome, the assembly including the first brake part 33, the second coupling part 8 and the second ring 36, snaps axially towards the first ring 35 and the first coupling part 6, with the supporting element 42' coming to rest in the deepest point 43 of the circumferentially adjoining setting contour 41'. In this condition, the brake 4 is open again and the coupling 3 is closed, as shown in FIG. 11.

An intermediate condition is not shown in the present example. This intermediate condition is reached when the supporting element 41' is positioned approximately half way towards the gradient portion 44. In this condition, the coupling 3 is open, but the brake 4 has not yet been activated. One advantage of the example of FIGS. 11 and 12 is that it permits quick changing from the braked condition in which the second shaft is braked relative to the fixed housing 13, into the torque transmitting condition in which the coupling 3 is closed so that a torque can be transmitted to the second shaft 9. It is understood that the contour of the supporting element 41' can also be configured as shown in the embodiment according to FIGS. 8 to 10. Furthermore, according to a modified example, the arrangement of the setting contour 41' and of the supporting elements 42' can also be reversed, i. e. the setting contours 41' can also be associated with the rotatingly drivable first ring 35, whereas the respective supporting elements 42' would then be associated with the axially movable second ring 36.

Figure 13:
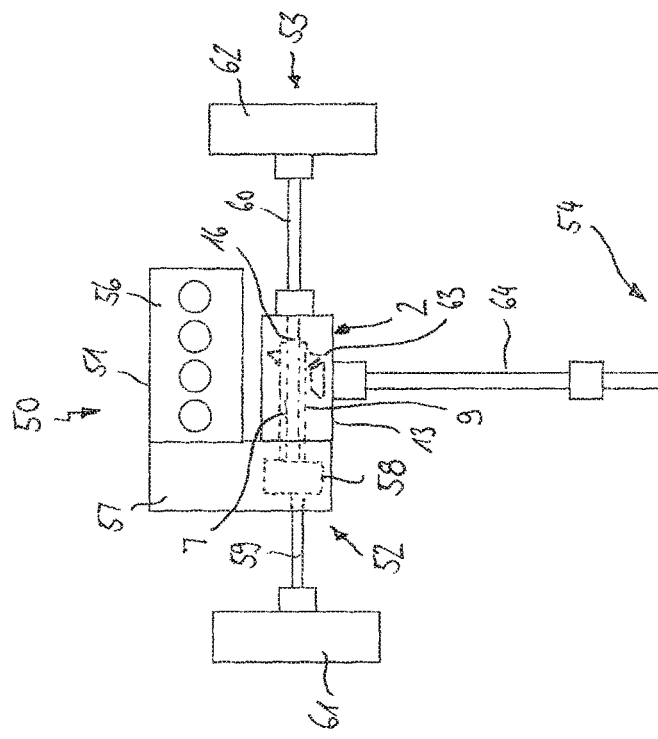
FIG. 13 shows an example drive assembly with an example coupling assembly in accordance with any one of FIGS. 1 to 12.

FIG. 13 is a diagrammatic illustration of an inventive driveline assembly 50 with an example coupling assembly 2. The driveline assembly 50 comprises a drive unit 51, a first driveline 52 for driving a first driving axle 53 and a second driveline 54 for driving a second driving axle 55. The drive unit 51 comprises an internal combustion engine 56 and a multi-step transmission 57 via which torque is introduced into the first and into the second driveline 52, 54. It is to be understood that the drive unit 51 can be any kind of drive, for instance an electric motor.

For dividing the torque, which is generated by the drive unit 51, for the two drivelines 52, 54, there is provided a transfer case 58 which can be provided in the form of a differential drive for instance. The transfer case 58 is connected to the coupling assembly 2 which can be provided in the form of one of the examples according to FIGS. 1 to 12. For this purpose, the housing 13 is connected via the connecting portion 14 to the housing of the transmission 57. The through-driveshaft 16 is connected to the first output part of the transfer case 58, whereas the first shaft 7 is drivingly connected to the second output part of the transfer case 58. The first driveline 52 comprises sideshafts 59, 60 which are connected to the transfer case 58 and via which the introduced torque is transmitted to the associated wheels 61, 62.

Via the coupling assembly 2, which can also be referred to as a power take-off unit, part of the torque can be transmitted from the first shaft 7, with the coupling 3 being closed, to the second shaft 9. The second driveline 54 is driven via the second shaft 9, with said second driveline 54 comprising in series the following components which are drivingly connected to one another for transmitting torque: a first angle drive 63, a propeller shaft 64, a second angle drive 65, a second coupling assembly 66 and a second axle differential 67 which, via sideshafts 68, 69, drives the wheels 71, 72 of the second driving axle 55. The second coupling assembly can be arranged upstream or downstream the differential or in one of the sideshafts 68, 69.

The angle drive 63 comprises a ring gear 73 which is connected to the second shaft 9 in a rotationally fixed way, as well as a bevel year 74 which is connected to the propeller shaft 64 via a constant velocity joint 75. The bevel gear 74 is rotatably connected via rolling contact bearings 76, 77 in a sleeve projection of the housing 13 so as to be rotatable around an axis of rotation B. The axis of rotation B extends perpendicularly relative to the axis of rotation A of the second shaft 9 and the ring gear 73.

A special feature of the driveline assembly 50 is that the driveline portion arranged in the power path between the two couplings 3, 66 can be set in a torque-free condition when the coupling 3 of the first coupling assembly 2 and the second coupling 66 are open. The coupling 3 can be used for transferring the shaft 9 and the components drivingly connected thereto into a torque-transmitting or torque-free condition. In the torque-free condition, the brake 4 of the first coupling assembly 2 makes it possible that the driveline completely stands still, so that performance losses due to drag moments and friction are reduced. Thus, fuel consumption is reduced for driving conditions under which only the first driving axle is driven and wherein the second driving axle runs in a torque-free condition. In an advantageous way, the brake 4, more particularly, ensures that when the system is switched to be in a torque-free condition, the coupling 66, preferably provided in the form of a friction plate coupling, can be quickly de-oiled, so that drag moments can be reduced.

The invention claimed is:

1. A coupling assembly for a driveline of a motor vehicle, comprising:
   a first shaft;
   a second shaft;
   a coupling arranged to selectively drivingly connect or disconnect the first shaft and the second shaft;
   a brake arranged to brake the second shaft relative to a stationary component; and
   an actuating device to actuate the coupling and the brake;
   wherein the actuating device comprises a ramp mechanism having a first ring that is axially supported relative to the stationary component, and a second ring that is axially movable relative to the first ring when one of the first and second rings is rotated relative to another one of the first and second rings;
   wherein the actuating device is configured such that the brake is not actuated until the coupling has at least partially been opened.

2. A coupling assembly according to claim 1, wherein at least one of following applies:
   the first ring is rotationally drivable relative to the stationary component by a drive;
   the second ring is rotationally secured relative to the stationary component.

3. A coupling assembly according to claim 1,
   wherein the coupling comprises a first coupling part and a second coupling part;
   wherein the first coupling part is connected to the first shaft in a rotationally fixed way and is axially supported relative to the stationary component; and
   wherein the second coupling part is connected to the second shaft in a rotationally fixed way and is axially displaceable relative to the first coupling part.

4. A coupling assembly according to claim 3,
   wherein the brake comprises an axially moveable brake part which is connected to the second coupling part, and a stationary brake part which is axially supported on the stationary component; and
   wherein, the moveable brake part can be moved by the actuating device into friction contact with the stationary brake part so as to be braked relative thereto.

5. A coupling assembly according to claim 1, wherein the ramp mechanism is designed such that, starting from an end position in which the first ring and the second ring axially approach one another, in a first rotation range the coupling is opened by rotating the first ring relative to the second ring, and such that, if rotation continues in the same direction of rotation, in a second rotation range the brake is closed.

6. A coupling assembly according to claim 5, wherein the brake is reopened by relatively rotating the first ring and the second ring in an opposed direction of rotation from the second rotation range into the first rotation range.

7. A coupling assembly according to claim 5, wherein the brake is reopened by continuing to relatively rotate the first ring and the second ring in the same direction of rotation beyond the second rotation range.

8. A coupling assembly according to claim 5, wherein, starting from the end position in which the two rings axially approach one another, at least one of the first and second ring comprises a first ramp portion with a first gradient and a second ramp portion with a second gradient, wherein the first gradient is greater than the second gradient.

9. A coupling assembly according to claim 8, wherein an intermediate portion is provided between the first ramp portion and the second ramp portion, the intermediate portion comprising a gradient which is smaller than the first and second gradient of the first and the second ramp portion.

10. A coupling assembly according to claim 5, wherein in said first rotation range, a first rotation plunge ratio is at least one of larger than 2° rotation per millimeter plunge and smaller than 8° rotation per millimeter plunge.

11. A coupling assembly according to claim 5, wherein in said second rotation range, a second rotation plunge ratio is at least one of larger than 15° rotation per millimeter plunge and smaller than 23° rotation per millimeter plunge.

12. A coupling assembly according to claim 1, wherein the actuating device comprises a drive and a transmission, wherein the transmission has a transmission ratio between an input and an output which is larger than $\frac{1}{25}$ and smaller than $\frac{1}{15}$.

13. A coupling assembly according to claim 1, wherein a returning spring is provided to which at least one of following applies:
   the returning spring loads at least a part of the brake in an opening context;
   the returning spring loads the coupling in a closing context.

14. A coupling assembly according to any claim 4, wherein a pretension spring is provided which is supported against the stationary component and is configured to axially pretension the stationary brake part towards the axially moveable brake part.

15. A coupling assembly according to claim 1, wherein the coupling is provided in the form of a dog clutch.

16. A driveline assembly for a motor vehicle, comprising:
   a permanently drivable first driveline with a first driving axle;
   an optionally drivable second driveline with a second driving axle;
   wherein the second driveline comprises a first coupling assembly, a second coupling assembly and a driveshaft which is arranged in the power transmission path between the first and the second coupling assembly,
   wherein at least one of the first and the second coupling assemblies comprises:
   a first shaft;
   a second shaft;
   a coupling arranged to selectively drivingly connect or disconnect the first shaft and the second shaft;
   a brake arranged to brake the second shaft relative to a stationary component; and
   an actuating device to actuate the coupling and the brake;
   wherein the actuating device comprises a ramp mechanism having a first ring that is axially supported relative to the stationary component, and a second ring that is axially movable relative to the first ring when one of the first and second rings is rotated relative to another one of the first and second rings;
   wherein the actuating device is configured such that the brake is not actuated until the coupling has at least partially been opened.

17. A driveline assembly according to claim 16, further comprising a transfer case which distributes a torque introduced by a drive unit to the first driveline and to the second driveline;

wherein the first driveline is drivingly connected to the transfer case so as to permanently transmit torque to the first driving axle, and wherein the second driveline is drivingly connectable to the transfer case so as to optionally transmit torque to the second driving axle;

wherein the driveshaft is provided in the form of a propeller shaft which is arranged in the power transmission path between the transfer case and the second driving axle; and wherein the first coupling assembly is arranged in the power transmission path between the transfer case and the propeller shaft.

\* \* \* \* \*